US008973018B2

(12) United States Patent
Gaikwad et al.

(10) Patent No.: US 8,973,018 B2
(45) Date of Patent: Mar. 3, 2015

(54) CONFIGURING AND RELAYING EVENTS FROM A STORAGE CONTROLLER TO A HOST SERVER

(75) Inventors: Umesh P. Gaikwad, Pune (IN); Divyank Shukla, Pune (IN)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 13/215,671

(22) Filed: Aug. 23, 2011

(65) Prior Publication Data
US 2013/0055290 A1    Feb. 28, 2013

(51) Int. Cl.
G06F 3/00 (2006.01)
G06F 9/44 (2006.01)
G06F 9/46 (2006.01)
G06F 11/00 (2006.01)
G06F 11/07 (2006.01)
G06F 11/14 (2006.01)
G06F 11/30 (2006.01)

(52) U.S. Cl.
CPC ........ G06F 11/0751 (2013.01); G06F 11/1443 (2013.01); G06F 11/3034 (2013.01); G06F 11/3051 (2013.01); G06F 11/0727 (2013.01); G06F 2201/86 (2013.01)
USPC .................................. 719/326; 714/E11.002

(58) Field of Classification Search
CPC ... G06F 11/1443; G06F 11/3034; G06F 9/44; G06F 11/0751; G06F 11/3051; G06F 11/0727; G06F 2201/86
See application file for complete search history.

(56) References Cited

U.S. PATENT DOCUMENTS

| | | | |
|---|---|---|---|
| 6,816,917 B2 | 11/2004 | Dicorpo et al. | |
| 6,839,815 B2 | 1/2005 | Kagami et al. | |
| 7,328,260 B1 | 2/2008 | Muthiyan et al. | |
| 7,469,325 B2 | 12/2008 | Shibayama et al. | |
| 7,496,646 B2 | 2/2009 | Casper et al. | |
| 7,698,592 B2 * | 4/2010 | Cashman | 714/4.2 |
| 7,882,393 B2 | 2/2011 | Grimes et al. | |
| 8,316,263 B1 * | 11/2012 | Gough et al. | 714/47.3 |
| 2006/0106999 A1 | 5/2006 | Baldwin et al. | |
| 2009/0172257 A1 | 7/2009 | Prins et al. | |
| 2010/0042705 A1 | 2/2010 | Helman et al. | |
| 2010/0064023 A1 | 3/2010 | Basham et al. | |

OTHER PUBLICATIONS

Racherla et al.; IBM Midrange System Storage Hardware Guide; Mar. 2010; 566 pages.*

(Continued)

*Primary Examiner* — H S Sough
*Assistant Examiner* — Kimberly Jordan
(74) *Attorney, Agent, or Firm* — Francis Lammes; Stephen J. Walder, Jr.; Randall J. Bluestone (57) ABSTRACT

A mechanism is provided for relaying events from a storage controller to a host server. Responsive to identifying an event occurring within a storage device, a notification is sent to a device server in the host server with which the event is associated. A server virtual disk is identified using a unique identification of the server virtual disk. Responsive to identifying the server virtual disk, at least one device executing an application on the host server is notified of an impending degradation in a mode of operation.

18 Claims, 4 Drawing Sheets

(56) References Cited

OTHER PUBLICATIONS

"How to configure your virtual Domain Controllers and avoid simple mistakes with resulting big problems", http://www.sole.dk/post/how-to-configure-your-virtual-domain-controllers-and-avoid-simple-mistakes-with-resulting-big-problems/?p=387, printed May 26, 2011, 9 pages.

Adams, Mark et al., "Symmetric Active-Active Controller", Optimizing Dynamic Workloads, Hitachi Data Systems, http://www.hds.com/assets/pdf/hitachi-whitepaper-symmetric-active-active-controller.pdf, Dec. 2010, 12 pages.

* cited by examiner

CONFIGURING AND RELAYING EVENTS FROM A STORAGE CONTROLLER TO A HOST SERVER

BACKGROUND

The present application relates generally to an improved data processing apparatus and method and more specifically to mechanisms for configuring and relaying events from a storage controller to a host server.

Storage virtualization is a concept and term used within computer science. Specifically, storage systems may use virtualization concepts as a tool to enable better functionality and more advanced features within the storage system.

Broadly speaking, a 'storage system' is also known as a storage array or a disk array. Storage systems typically use special hardware and software along with disk drives in order to provide very fast and reliable storage for computing and data processing. Storage systems are complex and may be thought of as a special purpose computer designed to provide storage capacity along with advanced data protection features. Disk drives are only one element within a storage system, along with hardware and special purpose embedded software within the system, which may be referred to as a storage controller.

SUMMARY

In one illustrative embodiment, a method, in a data processing system, is provided for relaying events from a storage controller to a host server. The illustrative embodiment sends a notification to a device server in the host server with which the event is associated in response to identifying an event occurring within a storage device. The illustrative embodiment identifies a server virtual disk using a unique identification of the server virtual disk. The illustrative embodiment notifies at least one device executing an application on the host server of an impending degradation in a mode of operation in response to identifying the server virtual disk.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In the existing distributed data processing systems that use fibre channel (FC) protocols, knowledgeable administrators configure disk array identification information and host server identification information (World Wide Port Name (WWPN) used by host servers) at a storage controller so that the storage controller may establish a mapping between each host server and one or more disks in the disk array that is utilized by the host server. However, currently, the WWPN is associated with a FC host bus adapter (HBA) with which the host server connects to the storage controller via a storage area network (SAN) fabric. Thus, in the event of a FC card failure in the host server requiring the FC HBA to be replaced at the host server, an administrator is required to manually reconfigure the storage controller with the WWPN of a new FC HBA, so that the same disks in the disk array may be exported to the host server. This adds to the administration over-head for managing storage controllers as well as host servers.

Then again, the FC protocol is not the only protocol used in storage system communications. That is, storage systems also communicate with host servers using Internet Small Computer System interface (iSCSI), Serial Attached SCSI (SAS), Fibre Connection (FICON), or even other protocols. However, similar issues exist with regard to these other protocols. For example, host server that use iSCSI, host servers use iSCSI Qualified Name (IQN) and iSCSI session identifier (ISID) as a unique identification for the host server or host server connection. Thus, the use of a transport identifier that host servers use to communicate with a storage controller is not a long term way to identify host servers.

Further, host servers need to perform certain operations so that the disks controlled by the storage controller are usable by the host servers. These operations may be as simple as running a 'fdisk-l' to see the attached hard disk drives, creating a logical volume group and then a logical disk in the logical volume group, or the like. Currently, there is no mechanism by which a storage controller may advise/direct host servers to perform these operations, which may lead to synchronization issues between the storage controller and the host server. For example, in a scenario where the transport between storage controller and the host server is iSCSI, if the host server fails to logins before logical unit number (LUN) mapping is performed by the storage controller, the host server will not be able to see the disk. That is, current storage controllers today are not intelligent enough to avoid these types of synchronization problems, which may cause difficulty in finding IQNs and mapping LUNs for host servers.

In a storage area network (SAN) environment, host servers remain oblivious to storage controller events, which results in a host server not reacting until a device failure is detected. Such behavior increases delays in various layers which may not be acceptable for some special purpose financial and transactional based systems. Current SAN systems also lacks infrastructural support for host servers that may want to operate or act on events that are being responded to by a storage controller. For example, a high-performing Web services portal that may want to notify or advise their clients to operate in a degraded mode since one or more backend controller nodes have gone down.

Further, current migration techniques for migrating LUNs from a legacy disk array to a storage controller may be very difficult and error prone. That is, current migration techniques require un-mapping the legacy disks from the host server, zoning out the host server from the legacy controller and zoning in the storage controller with the legacy disks, zoning in the storage controller and host server in a separate zone, mapping the legacy disk under the storage controller, creating a host object in the storage controller, mapping the disk from storage controller to the host object, and performing disk management procedures in the host server to make the disks accessible again to the applications.

Thus, existing storage controllers are not smart enough to communicate to the host servers utilizing disks controlled by the storage controllers. The host server is unaware of the events or the environment affecting the storage controller, which leads to host servers experiencing hard failures while using disks. Some host servers may even start to profile the disks in an attempt to tag a disk whose response is fast vis-à-vis a slower disk.

Therefore, the illustrative embodiments provide a mechanism within a storage controller that automatically enables and configures a host server in a SAN environment without having dependency on transport identifiers similar to how the storage controller enables and configures backend disk arrays. Further, by enabling and configuring host servers in this manner, the host server and/or storage controller may jointly determine a transport protocol to be used for input/output (I/O) transfer automatically and dynamically. Still further, by enabling and configuring host servers in this manner, the identity of the host server remains the same even if the host server undergoes FC card replacements.

Additionally, with the host server enabled and configured in this manner, the host server is capable of responding to events generated by the storage controller. This capability is useful when storage controllers identify that a disk that they have mapped to a host server is undergoing operational issues. Such enablement and configuration may also ensure that, without profiling of disk statistics at the host server, the host server may make various decisions relating to load balancing, incoming work, or the like. A key advantage of the illustrative embodiments provides such a mechanism results in a smarter and self-configuring storage controller. Such a storage controller does not need administrator intervention in events where the storage controller has re-masked, migrated the underlying backend disk controller, or the like. This framework will ensure the host server to be autonomic and self-healing in nature during failure conditions.

Figure 1:
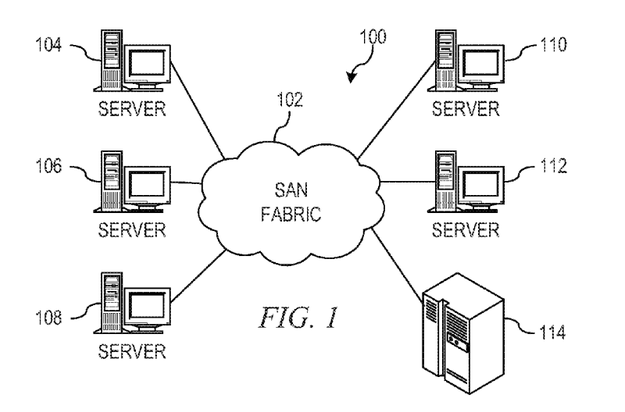
FIG. 1 depicts a pictorial representation of an example distributed data processing system in which aspects of the illustrative embodiments may be implemented.
Figure 2:
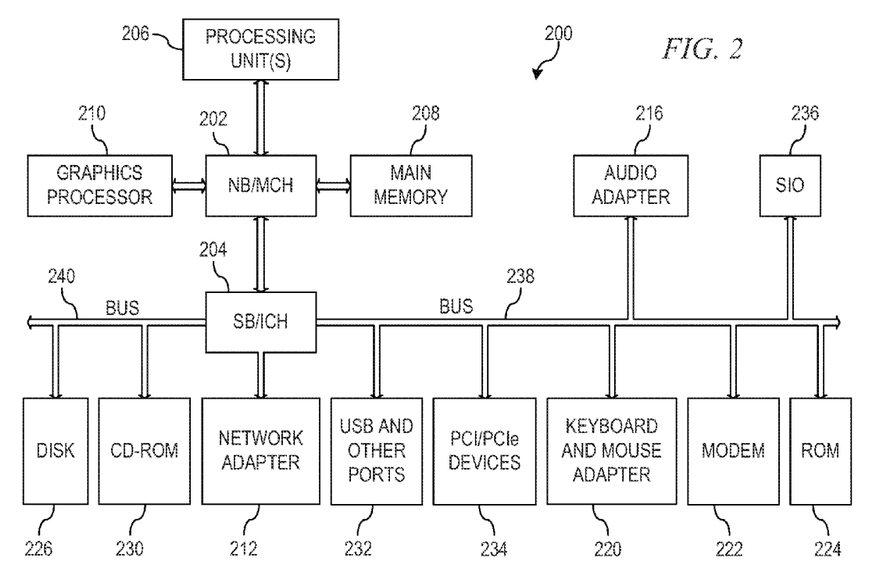
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one storage area network (SAN) fabric 102, which is the medium used to provide communication links between various devices and computers connected together within distributed data processing system 100. The SAN fabric 102 may include connections, such as wire, wireless communication links, fiber optic cables, switches, routers, etc. While distributed data processing system 100 uses SAN fabric 103 as one exemplary medium to provide communication links between various devices and computers connected together within distributed data processing system 100, the present invention is not limited to SAN fabric. That is, the present invention may be applicable to any data processing system with embedded software.

In the depicted example, servers 104, 106, 108, 110, 112 and storage system 114 connect to SAN fabric 102. Servers 104, 106, 108, 110, 112 write data to and read data from external storage systems, such as storage system 114. External storage systems typically include cache to reduce latency. However, in many configurations, several servers may access the same external storage, resulting in contention for resources and cache affinity going to other servers. SAN fabric 102 may be any interconnection, such as Fibre Channel, Fibre Connection (FICON), Serial Attached Small Computer Systems Interconnect (SAS), InfiniBand (IB), Fibre Channel over Convergence Enhanced Ethernet (FCOCEE), Internet Small Computer Systems Interconnect (iSCSI), etc.

FIG. 2 is a block diagram of an example data processing system in which aspects of the illustrative embodiments may be implemented. Data processing system 200 is an example of a computer, such as servers 104, 106, 108, 110, or 112 or storage system 114 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. While the depicted example illustrates NB/MCH 202 as being a separate unit from processing unit 206, other data processing system may embed a NB/MCH in the central processing unit. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, white PCIe does not. ROM 224 may be, for example, a flash basic input/output system (BIOS). HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204. While data processing system 200 many coupled I/O devices, not all I/O devices are required in all data processing systems. For example, in a storage system, I/O devices, such as graphics processor 210, audio adapter 216, keyboard and mouse adapter 220, or the like may not be necessary to operate the storage system.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
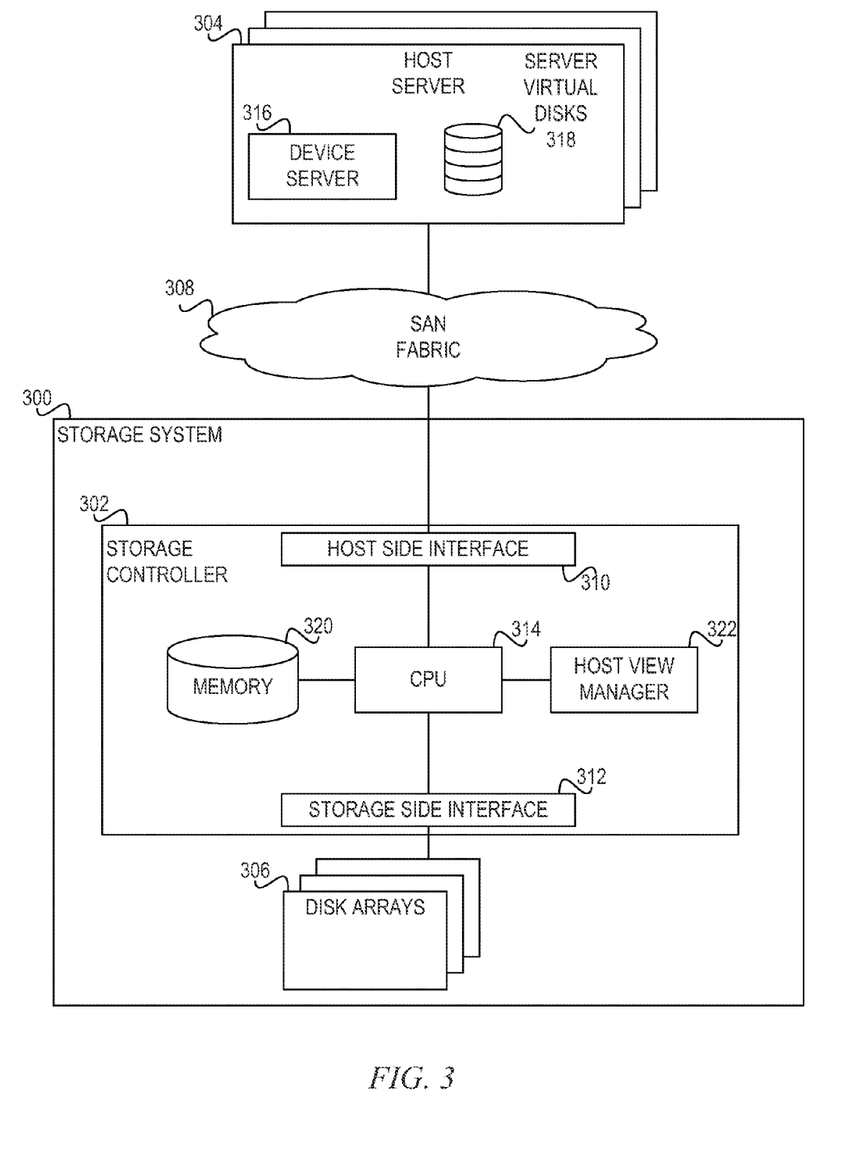
FIG. 3 is an example diagram of a storage system in accordance with one illustrative embodiment.

FIG. 3 is an example diagram of a storage system, such as storage system 114 of FIG. 1, in accordance with one illustrative embodiment. As shown in FIG. 3, the storage system 300 comprises storage controller 302 coupled to a plurality of host servers 304 and a plurality of disk arrays 306. Disk arrays 306 may be comprised of high performance storage devices, such as solid state drives (SSDs), and lower performance storage devices, such as hard disk drives (HDDs), coupled to storage controllers 302. Additional sets of storage devices may be provided without departing from the spirit and scope of the illustrative embodiments. Additionally, the storage controllers may have a storage cache (not shown) made from fast memory like DRAM that acts as a small but very fast storage tier.

Host servers 304 may be coupled to storage system 300 via Storage Area Network (SAN) fabric 308. Host servers 304 may connect to SAN fabric 308 via a host bus adapter (HBA) where SAN fabric 308 uses a Fibre Channel (FC) protocol, a network interface card (NIC) where SAN fabric 308 uses an Internet SCSI (iSCSI) protocol, a converged network adapter (CNA) where SAN fabric 308 uses Fibre Channel over Ethernet (FCoE) protocol, or the like. Storage controller 302 may connect to SAN fabric 308 via host side interface 310 and connect to disk arrays 306 via storage side interface 312. Central processing unit (CPU) 3(4 within storage controller 302 receives input/output (I/O) operations targeting storage system 300 from host servers 304, controls the distribution of the I/O operations to the various storage devices in the storage system 300, monitors the accesses and responses to and from the storage devices, handles exception conditions like failed HDDs, configures and initializes the various devices, and generally orchestrates the operation of storage system 300.

Thus, CPU 314 configures host objects corresponding to a need of each of host servers 304 to access disk arrays 306 managed by storage controller 302. Thus, in accordance with the illustrative embodiments, each of host servers 304 are configured with a device server 316 that comprises pseudo Small Computer System Interface (SCSI) target identifiers of server virtual disks 318 within host server 304, which causes storage controller 302 to treat server virtual disks 318 similar to each disk in disk arrays 306. That is, device server 316 maps storage controller 302 as a host to server virtual disks 318 similar to host servers 304 being mapped as hosts to disk arrays 306. Device server 316 supports SCSI target implementation, SCSI inquiry, read capacity, as well as other SCSI Primary Commands. Once the pseudo SCSI implementation is active, host server 304 may use properties of the mapping to server virtual disks 318 as a means to convey information about their transport protocols like World Wide Port Name (WWPN), Internet Small Computer System Interface (iSCSI), Serial Attached SCSI (SAS), Fibre Connection (FICON), or the like, to storage controller 302, CPU 314 may then use this information to find host server 304 in a SAN environment.

In detail, CPU 314 issues a login event to all entities (i.e., host server 304) coupled to SAN fabric 308 as the host server comes into the same zone. Responsive to the login event, device server 316 exports the information associated with server virtual disks 318 to CPU 314. Again, server virtual disks 318 are virtualized disks that serve as a representation for host server 304. CPU 314 then issue inquiry commands to device server 316 similar to inquiry commands that CPU 314 issues to anew one of disk arrays 306 whenever the new disk array is zoned with storage controller 302.

In response to the inquiry command, device server 316 returns Vital Product Data (VPD) to storage controller 302, which may comprise WWPNs of host server 304 that are in use, iSCSI Qualified Names (IQN) and iSCSI session identifiers (ISID) that are in use, page 0x83H (Standard Inquiry Data), or the like. Page 0x83H provide information that distinguishes between different host servers 304 coupled to SAN fabric 308. CPU 314 stores data from the VPD in memory 320 required for treating server virtual disks 318 as a standard disk. CPU 314 will use this data to create and configure host view manager 322. However, prior to creating and configuring host view manager 322, in order to distinguish server virtual disks 318 from disk arrays 306, CPU 314 issues a read capacity command to device server 316. In response to the read capacity command, device server 316 responds with zero size capacity, MAX supported size capacity, or the like, which then identifies server virtual disks 318 as virtual disks virtualized by host server 304, not a true disk array.

CPU 314 then automatically creates and configures host view manager 322 with each one of host servers 304 coupled to SAN fabric 308 and maps the transport identifiers received in the VPD for each of host servers 304. By storage controller 302 comprising host view manager 322, administrators no longer have to map storage protocol identifiers to a specific host server, which will avoid manual interactions with administrators and be independent of any protocol specific host server identification. Thus, storage controller 302 provides the intelligence to automatically identify a host server uniquely even if any protocol specific identifiers change in maintenance, for example WWPN, IQN, or the like.

By configuring host view manager 322 in the above described manner, host view manager 322 may export interfaces for error recovery procedures that would map to respective error recovery procedures in host server 304. These error recovery procedures enable host server 304 to take corrective actions in response to events that occur in storage controller 302 as well as events occurring in disk arrays 306 that are monitored by storage controller 302.

For example, if a disk within disk array 306 starts to fait, then host view manager 322 is able to inform any one of host servers 304 that are mapped to that particular disk that an event is about to occur and applications being executed by the identified host server 304 using that disk may then be able to provide an indication to the clients of those applications. This provide for the clients to be aware of a possible degraded in their mode of operations. Clients may then respond by restricting or deferring certain transactions or the host server may switch to a secondary site if available. This will enable clients of the applications to achieve trade-offs between guaranteed delivery and performance. Such event processing at the host level enables integration of the application with the storage controller and provides clients of the application executing on the host aware of the health of the storage controller and disk arrays managed by the storage controller. The provided integration may ensure that host servers and/or applications react to events identified by the storage controller even before a disk failure occurs.

In order to avoid handshake issues between storage controller 302 and host server 304, the illustrative embodiments use reserved SCSI operation codes (opcodes) to communicate the different operational failures occurring in storage controller 302 to host server 304. That is, storage controller 302 may refer to server virtual disks 318 via vdisk IDs and/or vdisk names. Conversely, host server 304 may refer to server virtual disks 318 as LUN IDs and/or entries in device file. Therefore, storage controller 302 and host server 304 need to be in agreement about the server virtual disks 318 both are going to operate on. This agreement may be achieved using a unique identification of server virtual disks 318 visible to host server 304 in device server 316 and host view manager 322 in storage controller 302. Thus, device server 316 may use unique identification of server virtual disks 318 to uniquely identify the mapped LUN with the host and the mapped device to the IAA.

Thus, in response to events that occur in storage controller 302 as well as events occurring in disk arrays 306 that are monitored by storage controller 302, device server 316 may interpret the unique identification of server virtual disks 318 provided by host view manager 322. Some events that might be of interest to an application being executed by host servers 304 may include:

Node_Pend_Iogrp Event/Node_going_down;
Node_UnPend_Iogrp Event/Node_coming_up;
Mdisk_Grp_Offline Event/Backend_disk_group_down;
Mdisk_Grp_Online Event/Backedn_disk_group_up;
Vdisk_Migration_Start Event/Virtual_disk_Migration_on;
Vdisk_Migration_End Event/Virtual_disk_Migration_off;
Vdisk Path Pend Event/Virtual_disk_path_down;
Vdisk Path UnPend Event/Virtual_disk_path_up;
Vdisk Cache Invalidation/Virtual Disk Invalidated;
Vdisk Migration Happening/Virtual Disk Migration in progress;
Extent Migration in Progress/Virtual Disk not fully usable;
Upgrade_In_Progress/Back_End_Front_End_SW_Upgrade;
Bad_Block_In_Disk/Bad Blocks_Encountered;
Bad_Track_In_Disk/Bad_tracks_in_Disk; or
Bad_Track_Prevention_In_Disk/Bad_Track_Induced_Due_To_Simultaneous_Track_Corruption.

While the above list provides examples of events that may be of interest to an application being executed by host servers 304, the list is not an exhaustive list. That is, the list will grow with application's interest in storage controller events and capabilities. Similarly, any events which might be of interest to host may also be added using host management procedures. These host management procedures may be contextual in nature and depend on whether host server 304 is acting as a storage server, a storage client, or a server that hosts applications, which may have different requirement.

The foregoing description has been directed to specific embodiments of the present invention. However, it will be apparent to one of ordinary skill in the art that other variations and modifications may be made to the described embodiments, without departing from the spirit and scope of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "mechanism," "circuit," "module," "logic," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
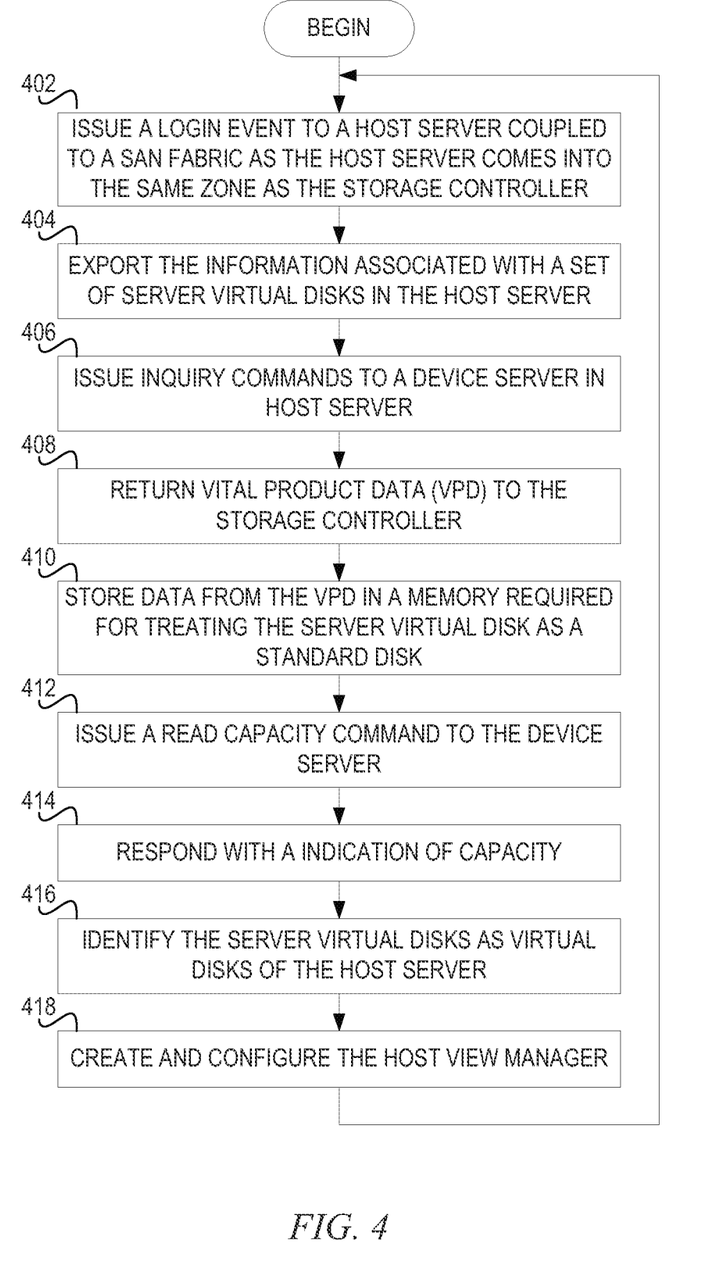
FIG. 4 depicts a flowchart of the operation performed in creating and configuring a host view manager in accordance with an illustrative embodiment.

FIG. 4 depicts a flowchart of the operation performed in creating and configuring a host view manager in accordance with an illustrative embodiment. As the operation begins, a central processing unit with a storage controller issues a login event to a host server coupled to a SAN fabric as the host server comes into the same zone as the storage controller (step 402). Responsive to the login event, a device server in each host server exports the information identifying a set of server virtual disks in the host server (step 404). The CPU then issues inquiry commands to a device server similar to inquiry commands that the CPU issues to anew one or more disk arrays coupled to the storage controller whenever the new disk array is zoned with the storage controller (step 406).

Responsive to the inquiry command, the device server returns Vital Product Data (VPD) to the storage controller (step 408). The CPU stores data from the VPD in a memory within the storage controller required for treating the server virtual disks as a standard disk (step 410). The CPU will use this data to create and configure a host view manager. Prior to creating and configuring the host view manager, in order to distinguish the server virtual disks from the disk arrays; the CPU issues a read capacity command to the device server (step 412). Responsive to the read capacity command, the device server responds with an indication of capacity, such as zero size capacity, MAX supported size capacity, or the like (step 414). The CPU uses this indication of capacity to identify the server virtual disks as virtual disks virtualized by the host server, i.e. not a true disk array (step 416).

The CPU then automatically creates and configures the host view manager with the host server coupled to the SAN fabric (step 418) by mapping the transport identifiers received in the VPD for the host server, with the operation returning to step 402 for each additional host server. By storage the controller comprising the host view manager, administrators no longer have to map storage protocol identifiers to a specific host server, which will avoid manual interactions with administrators and be independent of any protocol specific host server identification. Thus, the storage controller provides the intelligence to automatically identify a host server uniquely even if any protocol specific identifiers change in maintenance, for example WWPN, IQN, or the like.

Figure 5:
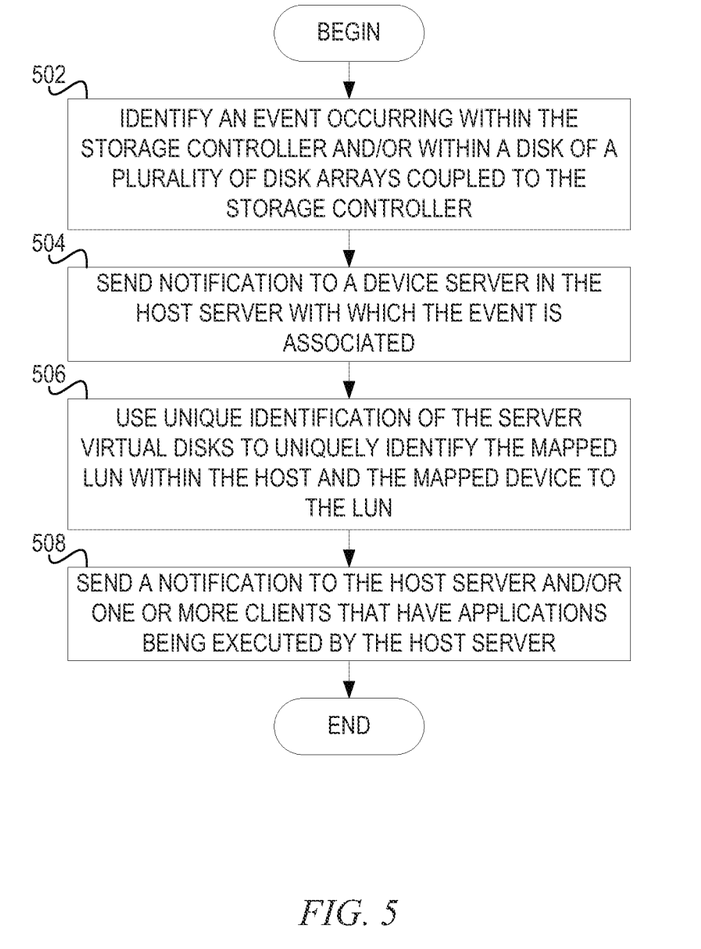
FIG. 5 depicts a flowchart of the operation performed for relaying events from a storage controller to a host server in accordance with an illustrative embodiment.

FIG. 5 depicts a flowchart of the operation performed for relaying events from a storage controller to a host server in accordance with an illustrative embodiment. As the operation begins, the storage controller identifies an event occurring within the storage controller and/or within a disk of a plurality of disk arrays coupled to the storage controller (step 502).

Responsive to identifying such an event, a host view manager within the storage controller sends notification to a device server in the host server with which the event is associated (step 504). The notification may include one or more SCSI operation codes (opcodes) associated with the event as well as a unique identification of the server virtual disks visible to the host server. The device server use unique identification of the server virtual disks to uniquely identify the mapped LUN within the host and the device mapped to the LUN (step 506). That is, the host view manager may refer to the server virtual disks via vdisk IDs and/or vdisk names. Conversely, the host server may refer to the server virtual disks as LUN IDs and/or entries in device file. Thus, the host view manager and device server use and agreed to unique identification of the server virtual disks.

Upon identifying the server virtual disk associated with the notification of the event, the device server sends a notification to the host server and/or one or more clients that have applications being executed by the host server (step 508), with the operation ending thereafter. This notification provides for the clients to be aware of a possible degraded in their mode of operations. Clients may then respond by restricting or deferring certain transactions or the host server may switch to a secondary site if available. This will enable clients of the applications to achieve trade-offs between guaranteed delivery and performance. Such event processing at the host level enables integration of the application with the storage controller and provides clients of the application executing on the host aware of the health of the storage controller and disk arrays managed by the storage controller. The provided integration may ensure that host servers and/or clients react to events identified by the storage controller even before a disk failure occurs.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s), should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for automatically enabling and configuring a host server in a SAN environment without having dependency on transport identifiers similar to how the storage controller enables and configures backend disk arrays. Further, by enabling and configuring host servers in this manner, the host server and/or storage controller may jointly determine a transport protocol to be use for input/output (I/O) transfer automatically and dynamically. Still further, by enabling and configuring host servers in this manner, also ensures that identity of host server remains the same even if the host server undergoes FC card replacements.

Additionally, with the host server enabled and configured in this manner, the host server is capable of responding to events generated by the storage controller. This capability is useful when storage controllers identify that a disk that they have mapped to a host server is undergoing operational issues. Such enablement and configuration may also ensure that, without profiling of disk statistics at the host server, the host server may make various decisions relating to load balancing, incoming work, or the like. A key advantage of the illustrative embodiments provides such a mechanism results in a smarter and self-configuring storage controller. Such a storage controller does not need administrator intervention in events where the storage controller has re-masked, migrated the underlying backend disk controller, or the like. This framework will ensure the host server to be autonomic and self-healing in nature during failure conditions.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for relaying events from a storage controller to a host server, the method comprising:
 responsive to identifying an event occurring within a storage device, sending, by a host view manager within the storage controller, a notification to a device server in the host server with which the event is associated, wherein the host view manager identifies the device server in the host server based on a configuration and wherein the configuration of the host view manager comprises:
 issuing, a processor within the storage controller, a login event to the device server;
 exporting, by the device server, information identifying a set of server virtual disks to the storage controller;

issuing, by the processor, inquiry commands to the device server or each rver virtual disk in the set of server virtual disks;

returning, by the device server vital product data associated with each of the set of server virtual disks to the storage controller;

issuing, by the processor, a read capacity command to the device server for each server virtual disk in the set of server virtual disks: and for each server virtual disk in the set of server virtual disks, responsive to an indication of zerosize capacity, configuring, by the processor, the server virtual disk in the host view manager;

identifying, by the device server, a server virtual disk using a unique identification of the virtual disk; and responsive to identifying the server virtual disk, notifying, by the device server, at least one device executing an application on the host server of an impending degradation in a mode of operation.

2. The method of claim 1, wherein the notification comprises Small Computer System Interface (SCSI) operation codes (opcodcs) associated with the event as well as a unique identification of virtual disks visible to the host server.

3. The method of claim 1, wherein identifying the server virtual disk using the unique identification of the server virtual disk comprises:

using, by the device server, the unique identification of the server virtual disk to identify a logical unit number (LUN); and identifying, by the device server, the server virtual disk using the LUN.

4. The method of claim 1, further comprising:

mapping, by the processor, transport identifiers for the host server to each server virtual disk configured within the host view manager.

5. The method of claim 1, wherein the login event is issued as the host server comes into a same zone as the storage controller.

6. The method of claim 1, wherein the storage device is at least one of a storage controller or a disk within a disk array.

7. A non-transtory computer program product comprising a computer readable storage medium having a computer readable program stored therein, wherein the computer readable program, when executed on a computing device, causes the computing device to:

responsive to identifying an event occurring within a storage device, send a notification to a device server in a host server with which the event is associated, wherein the computer readable program identifies the device server in the host server based on a configuration and wherein the computer readable program configures the host view manger by causing the computing device to:

issue a login event to the device server;

export information identifying a set of server virtual disks to the storage controller;

issue inquiry commands to the device server for each server virtual disk in the set of server virtual disks;

return vital product data associated with each of the set server virtual disks to the storage controller;

issue a read capacity command to the device server for each server virtual disk in the set of server virtual disks; and for each server virtual disk in the set of server virtual disks, responsive to an indication of zero size capacity, configuri disk in the host view manager;

identify a server virtual disk using a unique identification of the server virtual disk; and responsive to identifying the server virtual disk, notify at least one device executing an application on the host server of an impending degradation in a mode of operation.

8. The computer program product of claim 7, wherein the notification comprises Small Computer System Interface (SCSI) operation codes (opcodes) associated with the event as well as a unique identification of server virtual disks visible to the host server.

9. The computer program product of claim 7, wherein the computer readable program to identify the server virtual disk using the unique identification of the server virtual disk causes the computing device to:

use the unique identification of the server virtual disk to identify a logical unit number (LUN); and identify the server virtual disk using the LUN.

10. The computer program product of claim 7, wherein the computer readable program further causes the computing device to:

map transport identifiers for the host serer to each server virtual disk configured within the host view manager.

11. The computer program product of claim 7, wherein the login event is issued as the host server comes into a same zone as the storage controller.

12. The computer program product of claim 7, wherein the storage device is at least one of a storage controller or a disk within a disk array.

13. An apparatus, comprising:

a processor; and a memory coupled to the processor, wherein the memory comprises instructions which, when executed by the processor, cause the processor to:

responsive to identifying an event occurring within a storage device, send a notification to a device server in a host server with which the event is associated, wherein the instructions identify the device server in the host server based on a configuration and wherein the instructions configure the host view manager by causing the processor to:

issue a login event to the device server;

export information identifying a set of server virtual disks virtualized by the host server to the storage controller;

issue inquiry commands to the device server for each serer virtual disk in the set of server virtual disks;

return vital product data associated with each of the set of server virtual disks to the storage controller;

issue a read capacity command to the device server for each serer virtual disk in the set of server virtual disks; and for each server virtual disk in the set of server virtual disks responsive to an indication of zero size capacity, configure the server virtual disk in the host view manager;

identify a server virtual disk using a unique identification of the server virtual disk; and responsive to identifying the server virtual disk, notify at least one device executing an application on the host server of an impending degradation in a mode of operation.

14. The apparatus of claim 13, wherein the notification comprises Small Computer System Interface (SCSI) operation codes (opcodes) associated with the event as well as a unique identification of server virtual disks visible to the host server.

15. The apparatus of claim 13, wherein the instructions to identify the server virtual disk using the unique identification of the server virtual disk cause the processor to:

use the unique identification ofthe server virtual disk to identify a logical unit number (LUN); and identify the server virtual disk using the LUN.

16. The apparatus of claim 13, wherein the instructions further causes the processor to:
    map transport identifiers for the host server to each server virtual disk configured within the host view manager.

17. The apparatus of claim 13, wherein the login event is issued as the host server comes into a same zone as the storage controller.

18. The apparatus of claim 13, wherein the storage device is at least one of a storage controller or a disk within a disk array.

* * * * *